US011223252B2

(12) United States Patent
Coppola et al.

(10) Patent No.: US 11,223,252 B2
(45) Date of Patent: Jan. 11, 2022

(54) ROTOR FOR AN ELECTRIC MACHINE

(71) Applicant: GM GLOBAL TECHNOLOGY OPERATIONS LLC, Detroit, MI (US)

(72) Inventors: Anthony M. Coppola, Rochester Hills, MI (US); Gayatri V. Dadheech, Bloomfield Hills, MI (US); Alireza Fatemi, Canton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 66 days.

(21) Appl. No.: 16/531,631

(22) Filed: Aug. 5, 2019

(65) Prior Publication Data
US 2021/0044168 A1 Feb. 11, 2021

(51) Int. Cl.
*H02K 1/30* (2006.01)
*H02K 1/27* (2006.01)
*H02K 1/24* (2006.01)

(52) U.S. Cl.
CPC .............. *H02K 1/30* (2013.01); *H02K 1/246* (2013.01); *H02K 1/276* (2013.01)

(58) Field of Classification Search
CPC ........... H02K 1/30; H02K 1/246; H02K 1/276

USPC .......... 310/156.21, 156.53, 156.56
See application file for complete search history.

(56) References Cited

U.S. PATENT DOCUMENTS

| 4,327,302 | A | * | 4/1982 | Hershberger | ......... D06F 37/304 310/156.56 |
| 2014/0327329 | A1 | * | 11/2014 | Kitada | ................. H02K 1/2766 310/43 |
| 2016/0226332 | A1 | * | 8/2016 | Bauce | ................. H01F 41/0233 |
| 2019/0199151 | A1 | * | 6/2019 | Loder | ................... H02K 1/276 |

FOREIGN PATENT DOCUMENTS

EP  3276801 A1  1/2018

* cited by examiner

*Primary Examiner* — Terrance L Kenerly
(74) *Attorney, Agent, or Firm* — Quinn IP Law

(57) ABSTRACT

An electric machine is described, and includes a rotor that is rotatably disposed in a stator. The rotor includes a rotatable shaft that is disposed on a longitudinal axis, and a plurality of laminations that are disposed on the rotatable shaft. The plurality of laminations are arranged on the rotatable shaft to form a plurality of axially-disposed cavities, wherein each of the cavities is defined by a surface. A coating is disposed on the surfaces of the cavities, and a curable filler material is introduced into each of the cavities. The curable filler material adheres to the plurality of laminations via the coating.

20 Claims, 5 Drawing Sheets

ROTOR FOR AN ELECTRIC MACHINE

INTRODUCTION

Rotary electric machines, such as motor-generator units, include a rotor configured to rotate about a shaft defining an axis, and a stator. During rotation, the rotor experiences mechanical stresses as the electro-magnetic force generated via the stator is converted to torque that is transferred to the rotor shaft. The dynamic speed and torque operating range of the electric machine may be limited based upon the mechanical stresses.

SUMMARY

An electric machine is described, and includes a rotor that is rotatably disposed in a stator. The rotor includes a rotatable shaft that is disposed on a longitudinal axis, and a plurality of laminations that are disposed on the rotatable shaft. The plurality of laminations are arranged on the rotatable shaft to form a plurality of axially-disposed cavities, wherein each of the cavities is defined by a surface. A coating is disposed on the surfaces of the cavities, and a curable filler material is introduced into each of the cavities. The curable filler material adheres to the plurality of laminations via the coating.

An aspect of the disclosure includes the curable filler material adhering to the surfaces of the cavities via the adhesive-enhancing surface coating.

Another aspect of the disclosure includes a plurality of permanent magnets being disposed in at least a portion of the cavities, wherein the coating is disposed on the outer surface of each of the permanent magnets, and wherein the curable filler material adheres to the plurality of laminations and the permanent magnets via the coating.

Another aspect of the disclosure includes the coating being an adhesive-enhancing surface coating.

Another aspect of the disclosure includes the adhesive-enhancing surface coating being a silicon-oxide material that is derived from one of siloxane, silanol and silane.

Another aspect of the disclosure includes the coating being disposed on the surfaces of the cavities at a layer thickness that is less than 50 nm.

Another aspect of the disclosure includes the laminations being fabricated from electrical steel.

Another aspect of the disclosure includes the plurality of laminations disposed on the rotatable shaft being disk-shaped laminations that are disposed on the rotatable shaft in a longitudinally-stacked arrangement, wherein each of the laminations includes a plurality of apertures, wherein the laminations are arranged on the rotatable shaft such that the apertures are aligned to form the axially-disposed cavities.

Another aspect of the disclosure includes each of the disk-shaped laminations being a plurality of ferrous bridges disposed at an outer periphery, wherein at least a portion of the plurality of ferrous bridges disposed at the outer periphery are removed subsequent to the introduction of the curable filler material introduced into the cavities.

Another aspect of the disclosure includes the plurality of disk-shaped laminations being disposed in the stacked arrangement absent a bonding material being interposed between adjacent pairs of the disk-shaped laminations.

Another aspect of the disclosure includes the plurality of laminations being disposed on the rotatable shaft in an axially-stacked arrangement, wherein the axially-stacked arrangement forms the plurality of axially-disposed cavities, and wherein the coating is disposed on surfaces of the plurality of laminations defining the cavities.

Another aspect of the disclosure includes the curable filler material being introduced into each of the cavities in liquid form and cured in place.

Another aspect of the disclosure includes the curable filler material adhering to the plurality of laminations via the coating to provide a mechanical interlock between the laminations.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
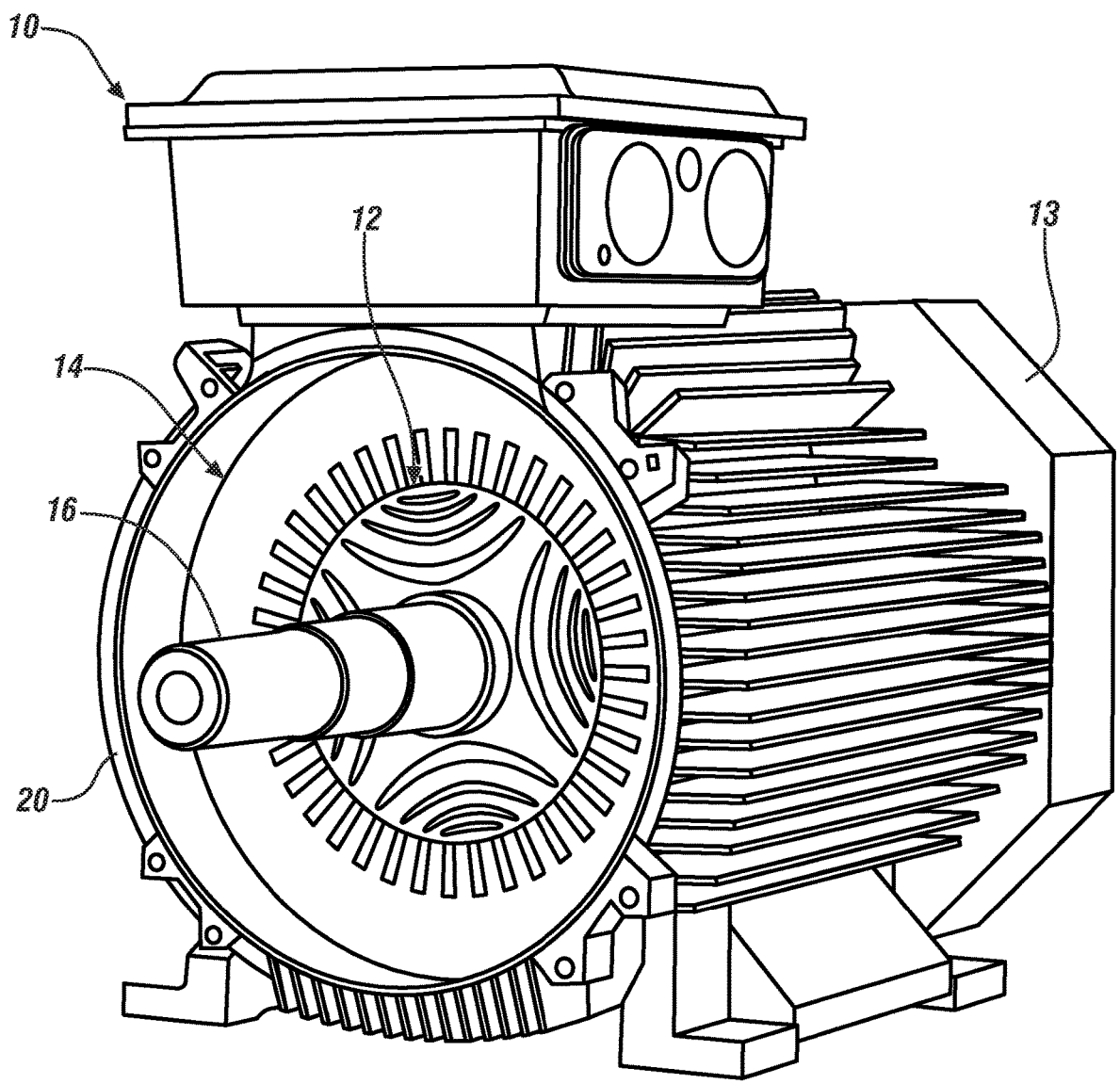
FIG. 1 schematically shows an isometric cutaway view of an electric machine, in accordance with the disclosure.

Referring to the drawings, wherein like reference numerals correspond to like or similar components throughout the several Figures, FIG. 1, consistent with embodiments disclosed herein, illustrates an electric machine 10. In one embodiment, the electric machine 10 may be arranged to generate tractive power for a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The electric machine 10 may be configured as an electric motor that is capable of transforming electric power to mechanical torque, a generator that is capable of transforming mechanical torque to electric power, or as a motor/generator that is capable of both.

The electric machine 10 includes a housing 20 and opposed end caps 13, one of which is shown. The housing 20 includes an annular opening into which a stator 14 is inserted. The stator 14 includes an annular opening into which a rotor 12 is inserted. The rotor 12 is mounted on a shaft 16, and the shaft 16 is supported on bearings mounted in the end caps 13. One end of the shaft 16 projects axially out of one of the end caps 13 and couples to a gear, pulley, or other device for torque transfer.

Figure 2:
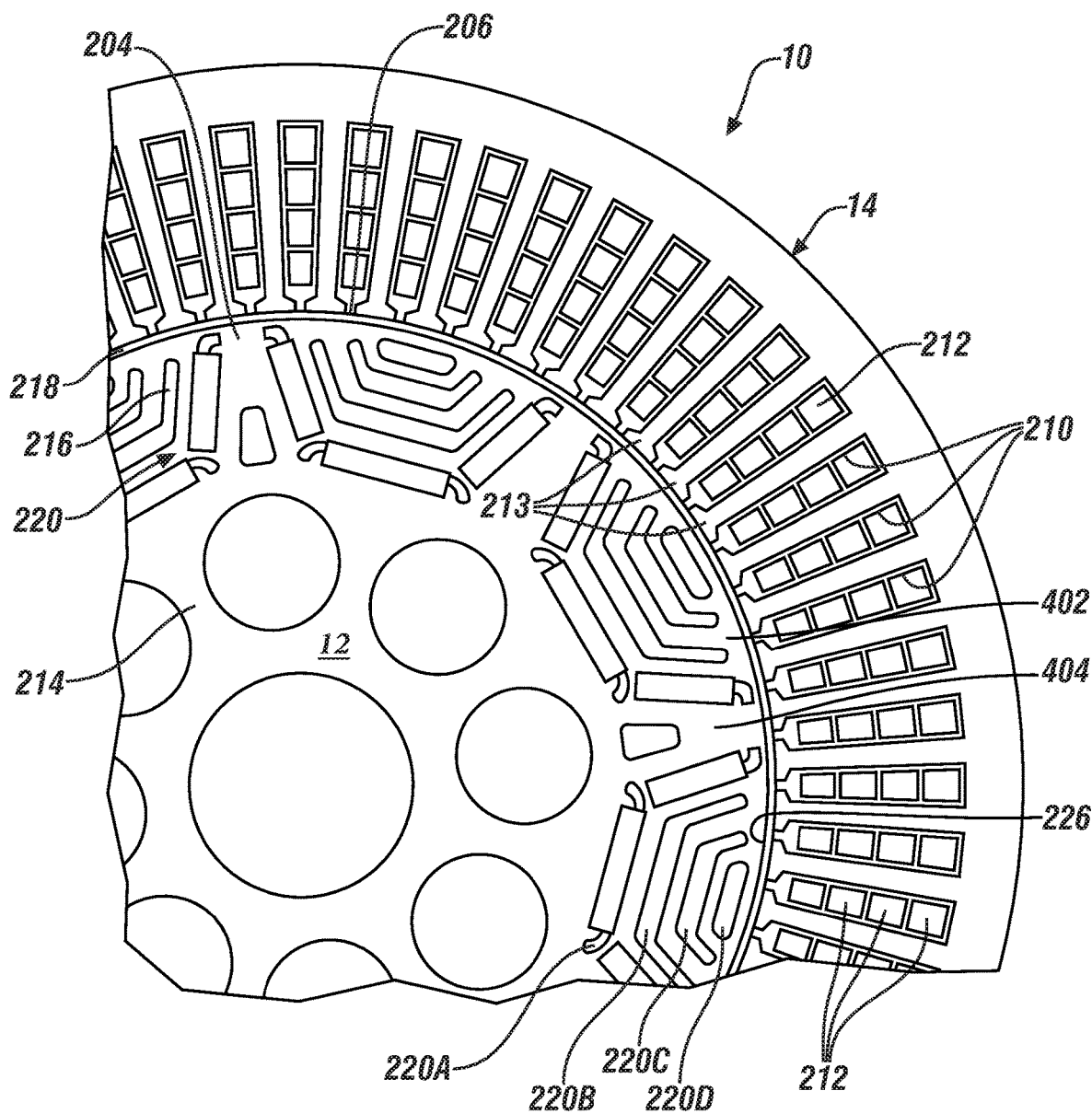
FIG. 2 schematically shows an end-view of a lamination for a rotor, in accordance with the disclosure.

Referring now to FIG. 2, a cutaway end-view of a portion of an embodiment of the electric machine 10, including rotor 12 and stator 14 is schematically shown. The stator 14 may be, for example, a multi-phase stator assembly. The stator 14 is coaxial with and radially surrounds the rotor 12 while maintaining a space 206 therebetween. In some aspects, the space 206 is between about 0.2 millimeters (mm) and about 1.0 mm to thereby maximize power output while reducing likelihood of contact between the stator 14 and the rotor 12 during rotation thereof. The stator 14 is generally annular along a longitudinal axis of the rotor 12. In one embodiment, a protective motor body (not shown) may surround an outer periphery of the stator 14 and may support the motor-generator shaft 208.

The stator 14 may include multiple radially elongated, circumferentially spaced stator slots 210 (e.g., 60 total slots). The stator slots 210 extend through the stator 14 longitudinally along the longitudinal axis. The stator slots 210 are configured to house electrically conductive, multiphase stator windings 212. The stator windings 212 may be grouped into different sets, each of which may carry an identical number of phases of electrical current, such as three, five, six, or seven phases. Passing current through the stator windings 212 will generate a magnetic field at the stator teeth 213. In addition, the stator windings 212 may extend axially beyond the longitudinal ends of the stator 14. A ratio of an outer diameter of the stator 14 to an axial length of the stator 14 (e.g., the distance along the axis A between the body's longitudinal ends not including an extending portion of the stator windings 212) may be, by way of non-limiting example, not less than 1.5 and not greater than 3.5, e.g., and may be determined at least to satisfy packing space constraints for a particular application of the motor-generator.

The rotor 12 is disposed about the motor-generator shaft 208 and may be splined, attached, fused, or otherwise rotationally fixed thereto. The rotor 12 is arranged as a laminated structure, and generally defines a right circular cylinder. The rotor 12 includes a plurality of ferromagnetic components 214 in the form of disc-shaped laminations, an adhesive-enhancing surface coating (coating) 215 and a curable filler material 216, as illustrated with reference to FIG. 4.

Referring again to FIG. 2, the ferromagnetic components 214, in combination with the curable filler material 216, are configured to produce a substantially continuous circular peripheral edge 218 of the rotor 12. The ferromagnetic components 214 may be arranged such that the rotor 12 includes a plurality of flux barriers 220 circumferentially arranged about the motor-generator shaft 208 between the motor-generator shaft 208 and the peripheral edge 218 of the rotor 12.

The flux barriers 220 have different magnetic properties from at least one adjacent component. For example, the flux barriers 220 may be non-magnetic while the adjacent portions are ferromagnetic. In some aspects, the flux barriers 220 are provided in the form of a generally non-magnetic material disposed between ferromagnetic components 214. In some aspects, the flux barriers 220 or selections thereof include one or more permanent magnets disposed therein. For example, the innermost, first through third layers 220A-220C include or are filled with permanent magnets while the outermost, fourth layer 220D does not include permanent magnets in one embodiment when the electric machine 10 is configured as an interior permanent magnet device. In further examples, the permanent magnets may be disposed in alternating layers, such as the first layer 220A and the third layer 220C, while the remaining layers do not include permanent magnets.

The ferromagnetic components 214 are formed from a ferromagnetic material configured to provide desired magnetic characteristics. For example, the ferromagnetic material may be electrical steel, iron, nickel, cobalt, combinations thereof, or the like. The laminated structure may be formed by, for example, stacking a plurality of ferromagnetic components 214 along the axis of rotation.

Figure 3A:
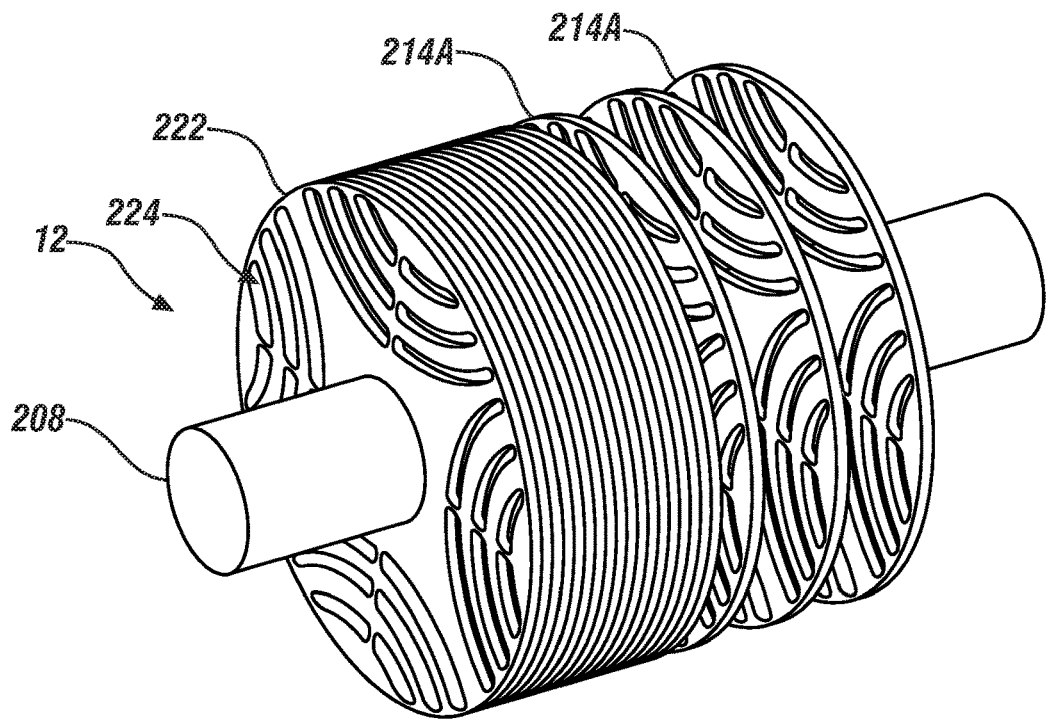
FIG. 3A schematically shows an isometric partially exploded view of an embodiment of a rotor for an electric machine, in accordance with the disclosure.

In one embodiment, the plurality of ferromagnetic components 214 may be configured as a plurality of disc-shaped laminations 214A, such as those illustrated in FIG. 3A, and the laminated structure is formed by the plurality of disc-shaped laminations 214A being stacked axially along the motor-generator shaft 208 such that each of the disc-shaped laminations 214A extends radially therefrom. The disc-shaped laminations 214A may be produced by forming, machining, molding, additive manufacturing processes, combinations thereof, and the like. For example, milling, stamping, extruding, metal injection molding, cutting, combinations thereof, and the like may be employed to produce plates having a desired shape or desired shapes.

Figure 3B:
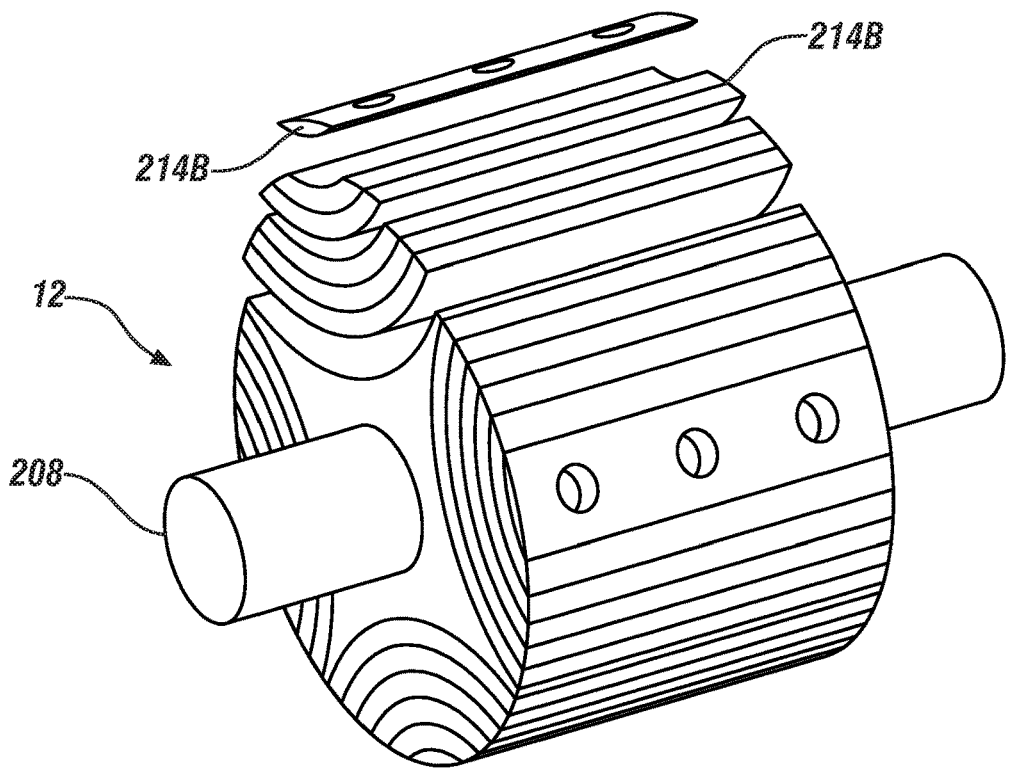
FIG. 3B schematically shows an isometric partially exploded view of another embodiment of a rotor for an electric machine, in accordance with the disclosure.

The plurality of ferromagnetic components 214 may be configured as plurality of members 214B, such as those illustrated in FIG. 3B, and the laminated structure is formed by the plurality of members 214B being arranged radially around the motor-generator shaft 208 and extending at least partially longitudinally therealong. The members 214B may be correspondingly shaped such that assembly of the plurality of members 214B results in the right circular cylinder. The members 214B may be produced by forming, machining, molding, additive manufacturing processes, combinations thereof, and the like. For example, milling, stamping, extruding, metal injection molding, cutting, combinations thereof, and the like may be employed to produce members having a desired shape or desired shapes. In some aspects, the plurality of ferromagnetic components 214 is configured to provide the rotor 12 with a saliency ratio of about 2 to about 10.

Referring again to FIG. 4, the adhesive-enhancing surface coating (coating) 215 is composed as a silicon-oxide (SiOx) material, which is applied to surfaces of the ferromagnetic components 214 to promote and enhance adhesive bonding between the ferromagnetic components 214 and the curable filler material 216. The coating 215 can be produced using a derivative of siloxane, silanols or silane-based precursor chemistry. In one embodiment, the coating 215 is applied to the surfaces of the ferromagnetic components 214 at a thin layer thickness, e.g., less than 50 nm. In one embodiment, the coating 215 is applied to the surfaces of the ferromagnetic components 214 at a layer thickness that is on the order of magnitude of 20 nm.

The curable filler material 216 may be an adhesive material providing high flexural strength, minimal void content, and full contact area. The curable filler material 216 may be an epoxy, a phenol, a silicone, or a polyurethane. In one embodiment, the curable filler material 216 has magnetic properties selected to strengthen the magnetic field of the rotor 12.

The curable filler material 216 is configured to transition from a flowable state to a substantially rigid state in response to curing of the curable filler material 216. The curable filler material 216 occupies the rotor cavities 224 between the ferromagnetic components 214 to maintain positions of the ferromagnetic components 214 during rotation of the rotor 12. In one embodiment, the curable filler material 216 occupies all rotor cavities 224. Alternatively, fewer than all rotor cavities 224 are occupied by the curable filler material 216.

The curable filler material 216 may be applied to the rotor 12 using, for example, molding techniques such as injection molding or epoxy molding. In some aspects, the curable filler material 216 forms an adhesive bond with edges 222 of the rotor cavities 224 to thereby optimize tensile stresses experienced by the ferromagnetic components 214.

Referring again to FIG. 2, the edges 222 of the rotor cavities 224 may define profiles to provide a mechanical interlock between the curable filler material 216 and the ferromagnetic components 214. For example, the edges 222 may include profiles having alternating protruding and recessed portions, such as a saw-tooth profile, crenellated profile, or cleated profile, such that surface-to-surface sliding between respective portions of the ferromagnetic components 214 and the curable filler material 216 is inhibited. In further examples, the edges 222 may include profiles having undercut portions, such as dovetail profiles or circular undercuts, such that both surface-to-surface sliding and delamination are inhibited. Beneficially, profiled edges 222 may be formed simultaneously with formation of the ferromagnetic components.

The profile features may be selected to provide desired mechanical properties. For example, the profiles may be rounded to further inhibit stress concentration present in corners of the material. Further, measure of the undercut angles may be minimized to provide lock-in while optimizing neck size and strength. It is contemplated that combinations of profiles may be provided. For example, edges 222 nearer the motor-generator shaft 208 may have a first profile to accommodate stresses experienced nearer the axis of rotation while edges 222 nearer the periphery of the rotor 12 may have a second profile to accommodate stresses experienced nearer the periphery of the rotor 12, such as those resulting from increased linear velocity and magnetic interactions with the stator 14.

The thermal expansion properties of the curable filler material 216 within the rotor cavities 224 are configured to approximate thermal expansion properties of the ferromagnetic components 214. In some aspects, the effective coefficient of thermal expansion of the curable filler material 216 is approximately equal to the coefficient of thermal expansion of the ferromagnetic components 214. In some aspects, the rotor cavities 224 and/or ferromagnetic components 214 are selectively shaped to mitigate differences in coefficients of thermal expansion for the materials.

Because the curable filler material 216 provides structural support for the ferromagnetic components 214 during rotation of the rotor 12, flux-leaking components such as ferrous bridges 402 and central posts 404 may be reduced in size to mitigate their effects on magnetic flux and flux leakage. Beneficially, in some aspects, the ferrous bridges 402 and/or central posts 404 are sacrificial components that may be removed after the curable filler material 216 is cured. In some aspects, the sacrificial components are removed via a mechanical process such as milling. In some aspects, the sacrificial components are a fusible material removed via, for example, chemical or thermal processes. Removal of the sacrificial components, e.g., some of the ferrous bridges 402 and/or central posts 404, facilitates increase in torque output of the electric machine 10.

In one embodiment, the rotor 12 includes an overwrap 226 circumscribing the periphery of the rotor. The overwrap 226 may be, for example, carbon fiber or other composite wraps. Beneficially, the overwrap 226 may be configured to mitigate differences in thermal expansion between the ferromagnetic components 214 and the curable filler material 216.

Rotor bodies 204 according to aspects of the present disclosure provide a number of benefits. For example, the rotor bodies 204 may optimize performance of the electric machine 10 through, for example, (1) strengthened magnetic interactions between the ferromagnetic components of the rotor 12 and electromagnetic components of the stator 14 by reducing space between a periphery of the rotor 12 and inner surface of the stator 14, (2) reducing thickness of or eliminating non-magnetic components disposed between magnetic components of the rotor 12 and magnetic components of the stator 14, such as sleeves or wraps, and/or (3) reducing thickness of or eliminating flux-leaking components of the rotor 12 that are disposed proximate to the stator 14. Further, rotor bodies 204 may provide for an increased number of flux barriers 220 within the same space while maintaining or increasing structural integrity of the rotor 12. Moreover, the curable filler material 216 provides structural integrity to the rotor 12 and thereby maintaining structural integrity of the rotor 12 at high RPM, which facilitates improvements in energy efficiency and peak rotational speeds. Beneficially, rotor bodies 204 in accordance with the present disclosure further optimize structural integrity during revolution of the rotor 12 by reducing rotor weight.

Figure 4:
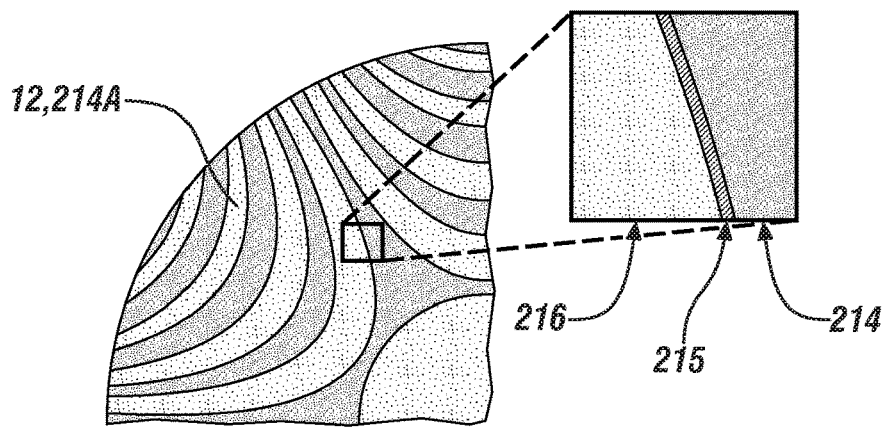
FIG. 4 schematically shows a partial end view of a lamination for a rotor, in accordance with the disclosure.
Figure 5:
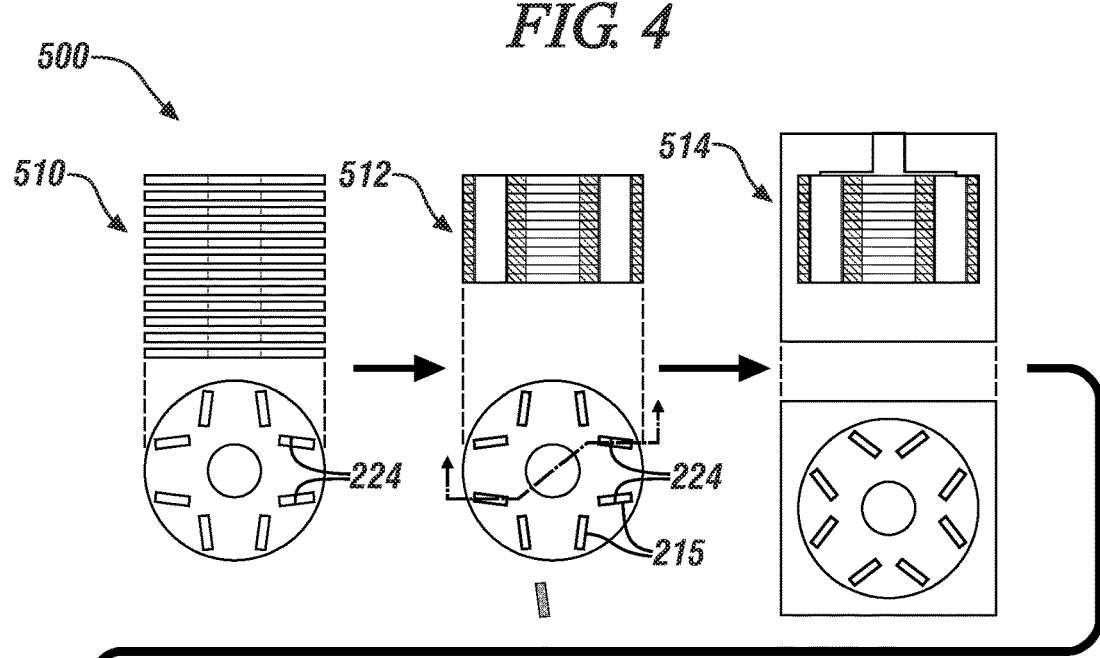
FIG. 5 schematically shows an embodiment of a process for assembling an embodiment of a rotor, in accordance with the disclosure.
Figure 5:
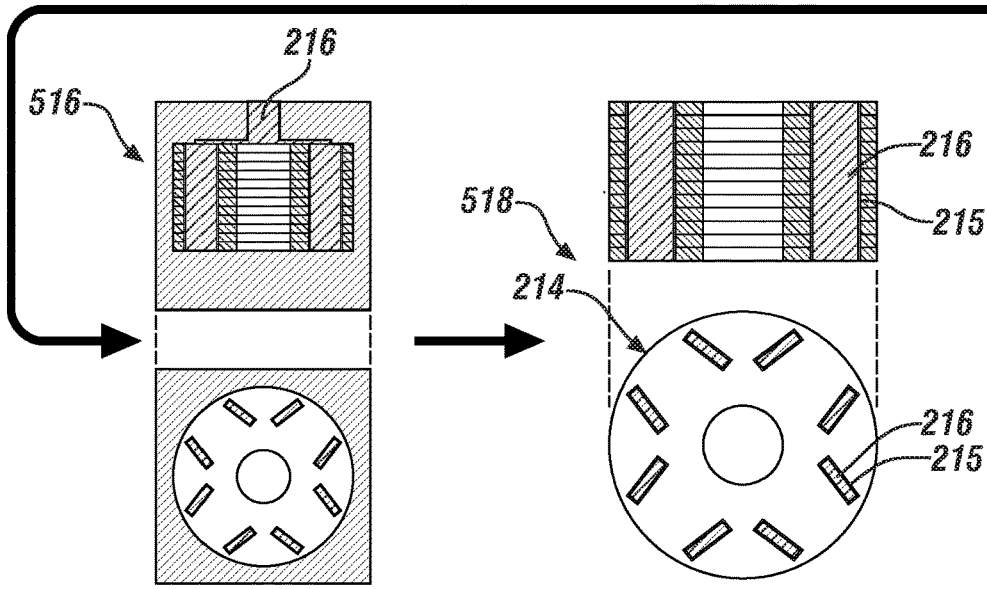

FIG. 5 pictorially shows a process 500 for assembling an embodiment of the rotor 12 described herein, including a side-view and corresponding end-view of the rotor 12 and disc-shaped laminations 214A that are described with reference to FIGS. 2, 3A and 4, including cavities 224. At step 510, a plurality of the disc-shaped laminations 214A are arranged in a stack, and aligned to form a plurality of the cavities 224. At step 512, the adhesive-enhancing surface coating (coating) 215 is applied to the cavities 224. At step 514, the stack of the disc-shaped laminations 214A is inserted into a mold, and at step 516, the curable filler material 216 is added to the mold employing molding techniques such as injection molding or epoxy molding, and cured. At step 518, the assembled rotor 12 is removed from the mold and is ready for additional assembly processes.

Figure 6:
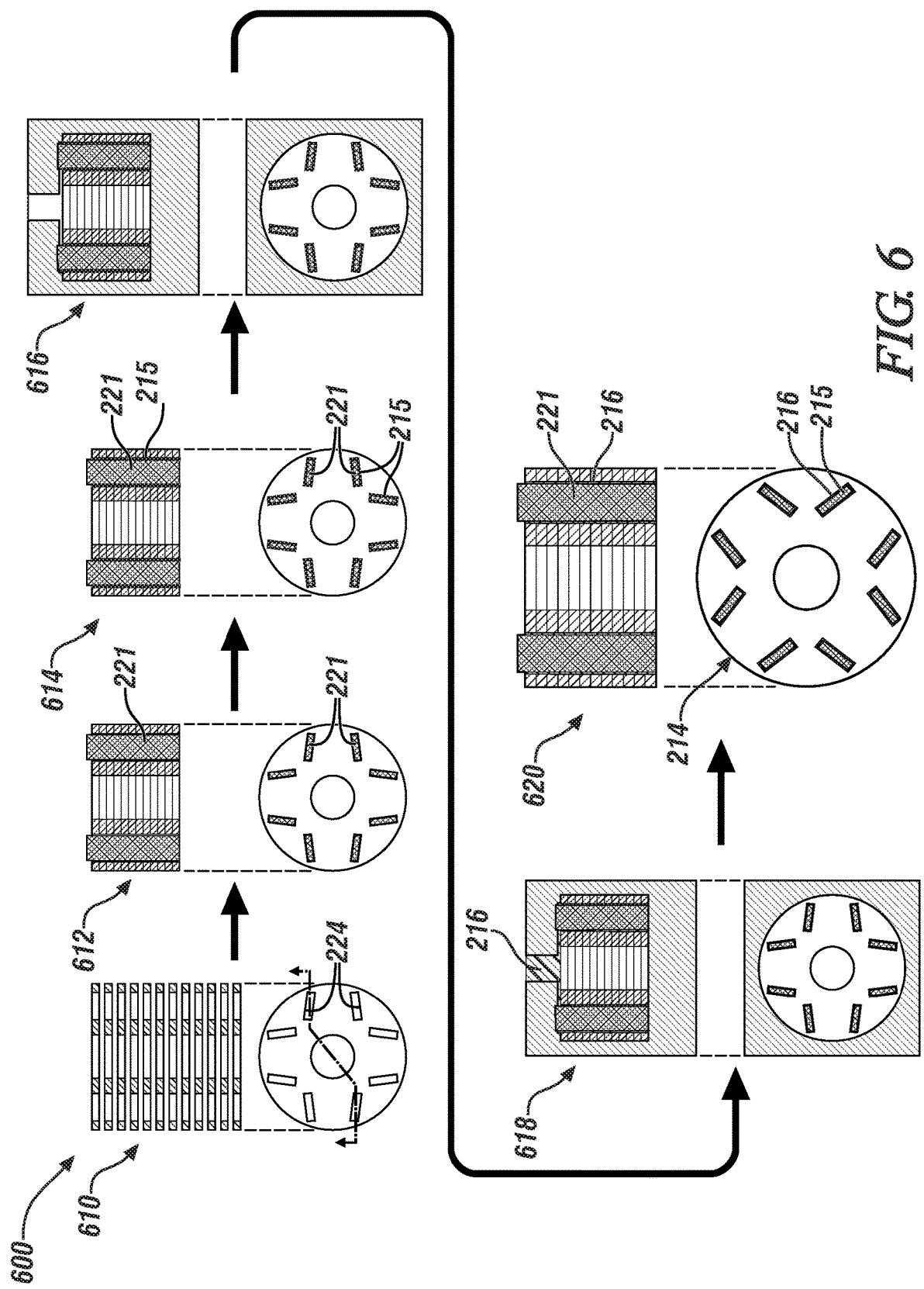
FIG. 6 schematically shows another embodiment of a process for assembling an embodiment of a rotor, in accordance with the disclosure.

FIG. 6 pictorially shows a process 600 for assembling an embodiment of the rotor 12 described herein, including a side-view and corresponding end-view of the rotor 12 and disc-shaped laminations 214A that are described with reference to FIGS. 2, 3A and 4, including cavities 224. At step 610, a plurality of the disc-shaped laminations 214A are arranged in a stack, and aligned to form a plurality of the cavities 224. At step 612, permanent magnets 221 are inserted into at least a portion of the plurality of the cavities 224. At step 614, the adhesive-enhancing surface coating (coating) 215 is applied to the cavities 224 and the permanent magnets 221. At step 616, the stack of the disc-shaped laminations 214A is inserted into a mold, and at step 618, the curable filler material 216 is added to the mold employing molding techniques such as injection molding or epoxy molding, and cured. At step 620, the assembled rotor 12 including the permanent magnets 221 is removed from the mold and is ready for additional assembly processes.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A rotor for an electric machine, comprising:
   a rotatable shaft, disposed on a longitudinal axis;
   a plurality of laminations disposed on the rotatable shaft and arranged to form a plurality of axially-disposed cavities, and wherein each of the cavities is defined by a surface;
   a coating disposed on the respective surface of each of the cavities;
   a curable filler material introduced into each of the cavities;
   wherein the coating is applied on the respective surface of each of the cavities prior to introducing the curable filler material into each of the cavities; and
   wherein the curable filler material adheres to the plurality of laminations via the coating.

2. The rotor of claim 1, further comprising:
   a plurality of permanent magnets disposed in a subset of the cavities,
   wherein the coating is disposed on an outer surface of each of the permanent magnets, and
   wherein the curable filler material adheres to the plurality of laminations and the permanent magnets via the coating.

3. The rotor of claim 1, wherein the coating comprises an adhesive-enhancing surface coating.

4. The rotor of claim 3, wherein the adhesive-enhancing surface coating comprises a silicon-oxide material that is derived from at least one selected from the group of siloxane, silanol and silane.

5. The rotor of claim 1, wherein the coating disposed on the surfaces of the cavities has a layer thickness that is less than 50 nm.

6. The rotor of claim 1, wherein the laminations are fabricated from electrical steel.

7. The rotor of claim 1, wherein the plurality of laminations disposed on the rotatable shaft comprises a plurality of disk-shaped laminations that are disposed on the rotatable shaft in a longitudinally-stacked arrangement, wherein each of the laminations includes a plurality of apertures, wherein the plurality of laminations are arranged on the rotatable shaft such that the apertures are aligned to form the plurality of axially-disposed cavities.

8. The rotor of claim 7, further comprising:
   wherein each of the disk-shaped laminations includes a plurality of ferrous bridges disposed at an outer periphery; and
   wherein at least a portion of the plurality of ferrous bridges disposed at the outer periphery are removed subsequent to the curable filler material being introduced into the cavities.

9. The rotor of claim 7, wherein the disk-shaped laminations are disposed in the stacked arrangement absent a bonding material being interposed between adjacent pairs of the disk-shaped laminations.

10. The rotor of claim 1, wherein the plurality of laminations are disposed on the rotatable shaft in an axially-stacked arrangement, wherein the axially-stacked arrangement forms the plurality of axially-disposed cavities, and wherein the coating is disposed on surfaces of the plurality of laminations defining the cavities.

11. The rotor of claim 1, wherein the curable filler material is introduced into each of the cavities in liquid form and is cured in place.

12. A rotor for an electric machine, comprising:
    a rotatable shaft, disposed on a longitudinal axis;
    a plurality of laminations arranged on the rotatable shaft to form a plurality of axially-disposed cavities, and wherein each of the cavities is defined by a respective surface;
    an adhesive-enhancing surface coating disposed on the respective surface of each of the cavities; and
    a curable filler material introduced into each of the cavities;
    wherein the coating is applied on the respective surface of each of the cavities prior to introducing the curable filler material into each of the cavities; and
    wherein the curable filler material adheres to the surfaces of the cavities via the adhesive-enhancing surface coating.

13. The rotor of claim 12, further comprising:
    a plurality of permanent magnets disposed in a subset of the cavities,
    wherein the adhesive-enhancing surface coating is disposed on an outer surface of each of the permanent magnets, and
    wherein the curable filler material adheres to the plurality of laminations and the permanent magnets via the adhesive-enhancing surface coating.

14. The rotor of claim 12, wherein the adhesive-enhancing surface coating comprises a silicon-oxide material that is derived from at least one selected from the group of siloxane, silanol and silane, and wherein the adhesive-enhancing surface coating is disposed on the surfaces of the cavities at a layer thickness that is less than 50 nm.

15. The rotor of claim 12, wherein the plurality of laminations disposed on the rotatable shaft comprises disk-shaped laminations that are disposed on the rotatable shaft in a longitudinally-stacked arrangement, wherein each of the laminations includes a plurality of apertures, wherein the laminations are arranged on the rotatable shaft such that the apertures are aligned to form the plurality of axially-disposed cavities.

16. The rotor of claim 12, wherein the laminations are disposed on the rotatable shaft in an axially-stacked arrangement, wherein the axially-stacked arrangement forms the plurality of axially-disposed cavities, and wherein the wherein the adhesive-enhancing surface coating is disposed on surfaces of the laminations defining the cavities.

17. An electric machine, comprising:
a rotor rotatably disposed in a stator;
the rotor comprising:
- a rotatable shaft, disposed on a longitudinal axis;
- a plurality of laminations arranged on the rotatable shaft to form a plurality of axially-disposed cavities, and wherein each of the cavities is defined by a surface;
- an adhesive-enhancing surface coating disposed on the surfaces of the cavities; and
- a curable filler material introduced into each of the cavities;
- wherein the coating is applied on the respective surface of each of the cavities prior to introducing the curable filler material into each of the cavities; and
- wherein the curable filler material adheres to the surfaces of the cavities via the adhesive-enhancing surface coating.

18. The electric machine of claim 17, further comprising:
a plurality of permanent magnets disposed in at least a portion of the cavities,
wherein the coating is disposed on an outer surface of each of the permanent magnets, and
wherein the curable filler material adheres to the plurality of laminations and the permanent magnets via the coating.

19. The electric machine of claim 17, wherein the adhesive-enhancing surface coating comprises a silicon-oxide material that is derived from at least one selected from the group of siloxane, silanol and silane, and is disposed on the surfaces of the cavities at a layer thickness that is less than 50 nm.

20. The rotor of claim 1, further comprising an overwrap; wherein the overwrap circumscribes a periphery of the rotor.

* * * * *